United States Patent [19]

Venelin

[11] 3,978,780

[45] Sept. 7, 1976

[54] COOKING UTENSIL

[76] Inventor: Christopher I. Venelin, 608 Larkspur Ave., Corona Del Mar, Calif. 92625

[22] Filed: Aug. 15, 1975

[21] Appl. No.: 605,048

[52] U.S. Cl. .................................. 99/422; 99/427
[51] Int. Cl.² ........................................ A47J 37/10
[58] Field of Search ............ 99/427, 409, 422–423, 99/443; 222/386; 425/110, 810

[56] References Cited
UNITED STATES PATENTS

| 2,189,200 | 2/1940 | Dusterdick | 99/409 |
| 2,962,985 | 12/1960 | Castronuovo | 99/427 |
| 3,340,793 | 9/1967 | Nilsen | 99/423 |
| 3,349,726 | 10/1967 | Fono | 99/423 X |
| 3,489,106 | 1/1970 | Lostanlen | 99/423 X |
| 3,630,140 | 12/1971 | Marrie | 99/423 |
| 3,850,087 | 11/1974 | Landblom et al. | 99/422 |

Primary Examiner—Peter Feldman
Assistant Examiner—Arthur O. Henderson
Attorney, Agent, or Firm—Gordon L. Peterson

[57] ABSTRACT

A cooking utensil comprising a receptacle for batter and a pumping member at least partially in the receptacle. The receptacle has a bottom wall and an open top and the pumping member is mounted for movement toward and away from the bottom wall. A heater having a cooking surface can be received in the receptacle through the open top. The heater is coupled to the pumping member so that the heater drives the pumping member toward the bottom wall as the heater is moved toward the bottom wall. This elevates the batter in the receptacle toward the heater.

11 Claims, 7 Drawing Figures

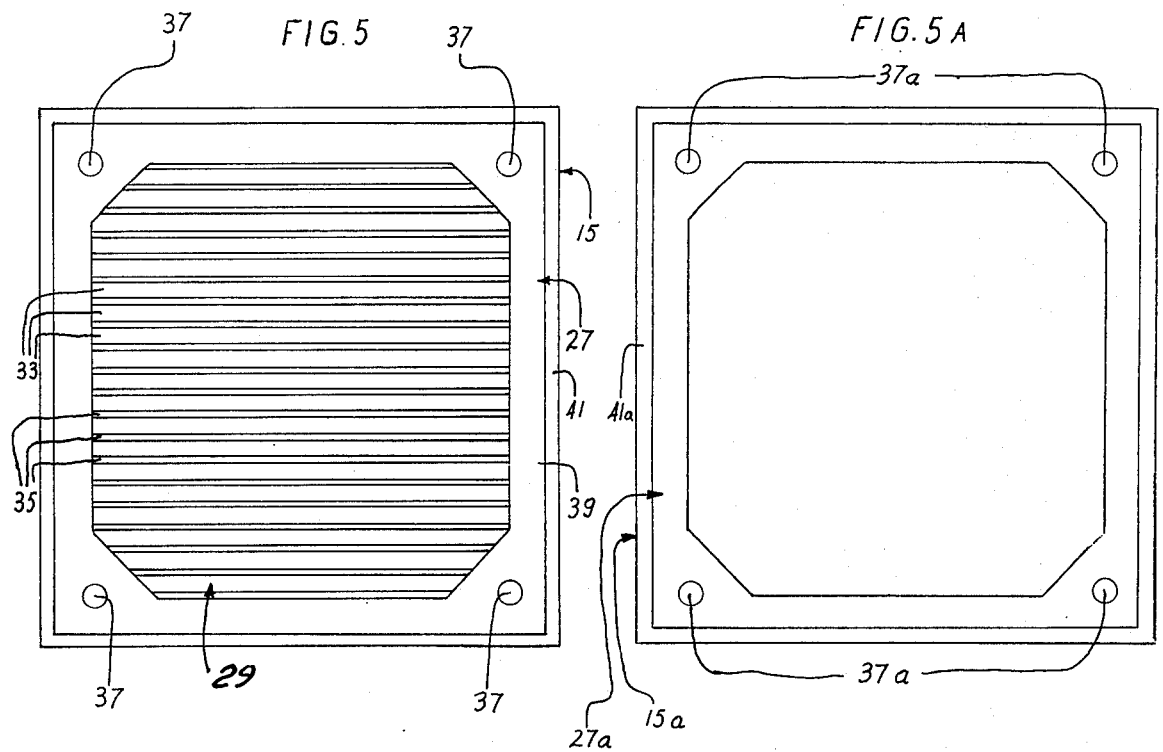
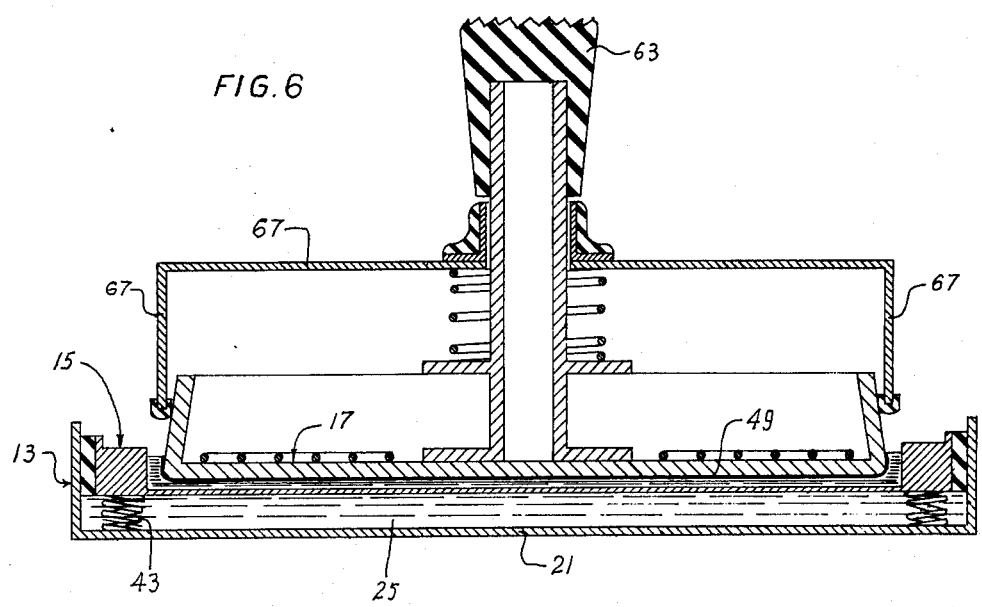

COOKING UTENSIL

BACKGROUND OF THE INVENTION

Crepes should be thin and as free of holes as possible. It is not possible with ordinary pan frying to make crepes as thin and hole free as desired.

There is also a variety of equipment for making pastries and the like which dip a heating element into a receptacle. Equipment of this general character is shown, for example, in U.S. Pat. Nos. 1,543,380, 2,962,985, 1,949,862, 1,781,441 and 2,786,430. Although a carefully controlled dipping process can reduce the holes in the crepe, these patented constructions do not provide the results desired. Moreover, if the dipping process is not carefully carried out, then bubbles are formed in the batter which adheres to the heating element and this, of course, provides holes in the crepe.

SUMMARY OF THE INVENTION

The present invention uses a pumping technique to promote thinness and to reduce or eliminate the holes in the crepe. With this invention, the batter is pumped against the cooking surface of a heater. In addition, turbulence is created in the batter as the heating element is withdrawn from the batter. These factors reduce the number of holes in the crepe while allowing the crepe to be very thin.

These desirable results can be obtained by utilizing a cooking utensil which includes a receptacle for receiving batter with the receptacle having a bottom wall and an open top. A heater having a cooking surface is sized to be received in the receptacle through the open top. The heater is movable between a first position in which the cooking surface is at a first distance from the bottom wall and a second position in which the cooking surface is in the receptacle at a second distance from the bottom wall. The second distance is less than the first distance so that the cooking surface can contact the batter in the second position.

One feature of the present invention is the provision of means responsive to movement of the heater from the first position toward the second position for forcing the batter in the receptacle upwardly toward the top of the receptacle. This advances or pumps the batter toward the cooking surface, and this tends to eliminate bubbles in the batter which adheres to the cooking surface.

Although this pumping action can be brought about in different ways, it is preferred to use a pumping member at least partially in the receptacle and mounted for movement toward and away from the bottom wall. The pumping member is then driven by the heater as the heater is moved toward the bottom wall. As the pumping member is forced deeper into the batter by the heater, it displaces the batter in the receptacle upwardly toward the cooking surface. Thus, the pumping action is accomplished without pumping additional batter into the receptacle.

It is desirable to use the receptacle for mounting the pumping member. This enables the pumping member to be mounted without adding any separate mounting structure for it. To accomplish this, the receptacle has a peripheral wall and the pumping member is slidably received within the peripheral wall and mounted thereby for movement toward and away from the bottom wall.

Resilient means can advantageously be provided for urging the pumping member away from the bottom wall. The heater can be supported by the pumping member so that the cooking surface is normally out of contact with the batter. However, by moving the heater toward the bottom wall, the cooking surface can be brought into contact with the batter.

The pumping member can be of various different configurations. The pumping member may include a peripheral wall open at its top to receive the heater. The bottom of the peripheral wall may be totally open or it may be partially covered by a wall. However, such wall must contain aperture means to allow the batter to contact the cooking surface. One advantage of such aperture means is that it tends to break up of filter out any lumps that may exist in the batter as the batter is pumped toward the cooking surface.

In addition to pumping, the pumping member also guides the movement of the heater. This reduces the skill required in making crepe. Because the movement of the heating element is guided, cocking or tilting of the heating element is prevented and the weight of the heating element is supported by the resilient means rather than the operator.

Another function of the pumping member is that it strikes the bottom wall of the receptacle before the cooking surface strikes the bottom wall. Thus, the pumping member and the bottom wall of the receptacle form a stop which prevents contact between the cooking surface and the heater. This in turn prevents the cooking surface from sticking to the bottom wall of the receptacle.

Finally, the pumping member creates waves or turbulence along the upper surface of the batter as the heating element is moved away from the bottom wall. Although it is not desired to be bound by any particular theory of operation, it is believed that this ripple of batter along the cooking surface tends to exclude air from the portion of the batter adhering to the cooking surface.

The invention, together with other features and advantages thereof, can best be understood by reference to the following description taken in connection with the accompanying illustrative drawing.

BRIEF DESCRIPTION OF THE DRAWING

FIG. 5 is a top plan view of one form of the pumping member.

FIG. 5A is a top plan view of a second form of the pumping member.

FIG. 6 is a sectional view similar to FIG. 2 illustrating the use of the cooking utensil.

DESCRIPTION OF THE PREFERRED EMBODIMENTS

Figure 1:
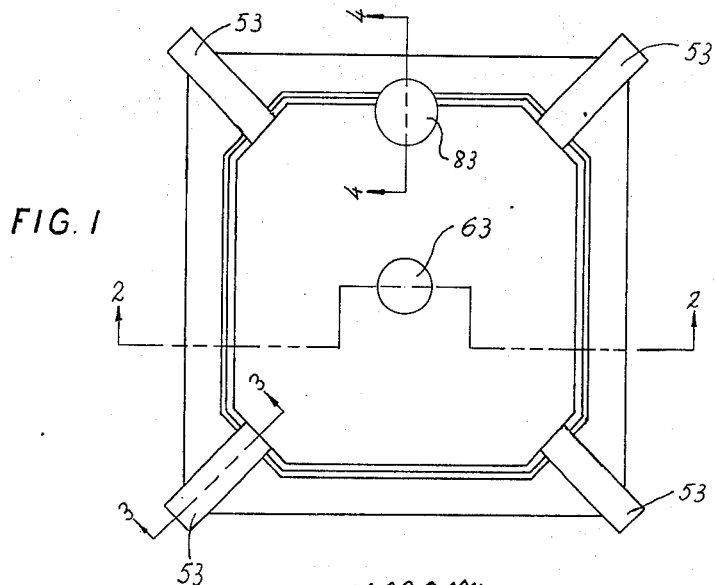
FIG. 1 is a top plan view of a cooking utensil constructed in accordance with the teachings of this invention.
Figure 2:
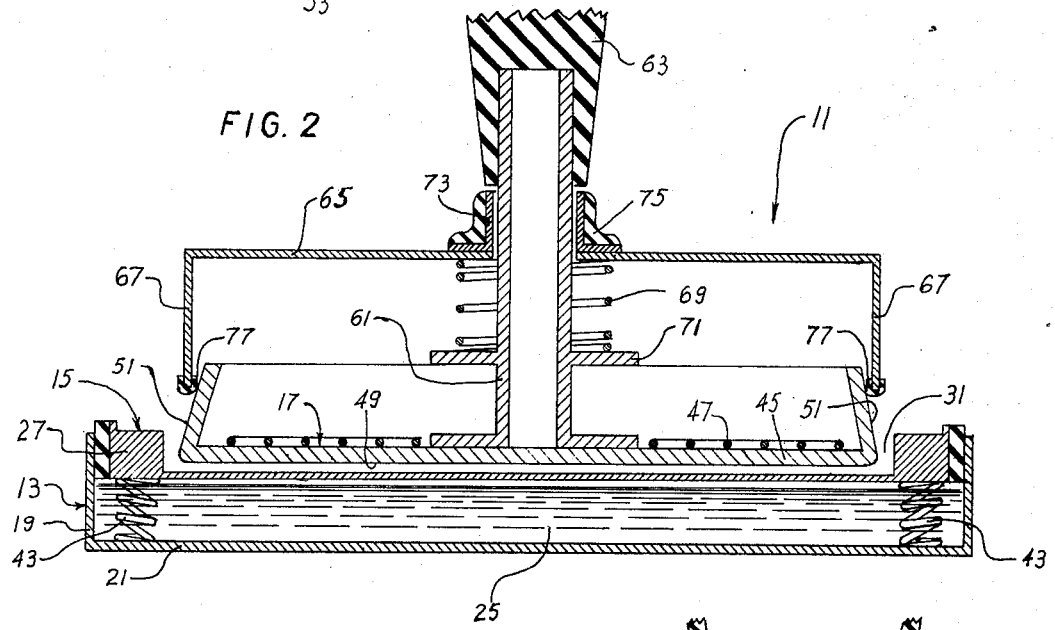
FIG. 2 is an enlarged fragmentary sectional view taken generally along line 2—2 of FIG. 1.
Figure 3:
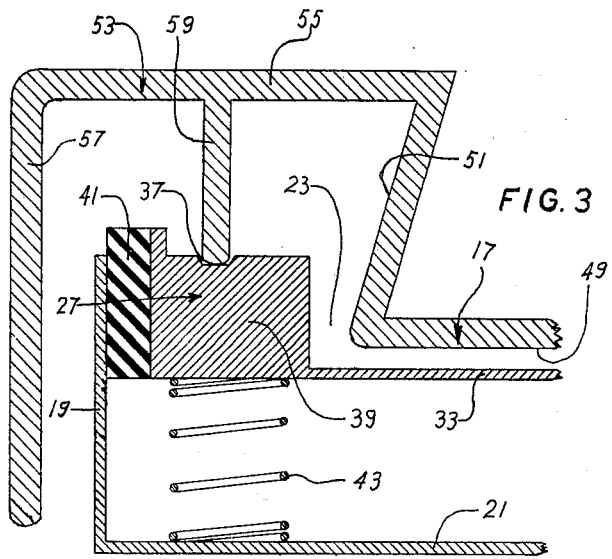
FIG. 3 is an enlarged fragmentary sectional view taken generally along line 3—3 of FIG. 1.
Figure 4:
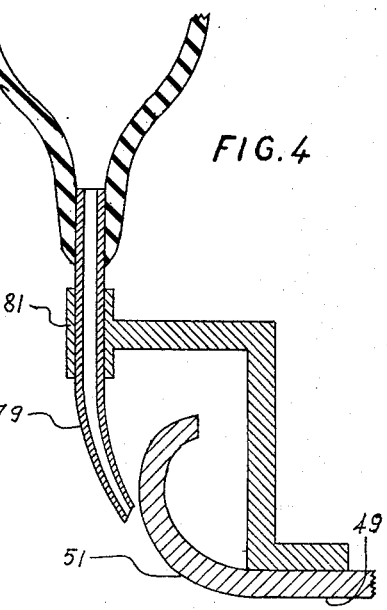
FIG. 4 is an enlarged fragmentary sectional view taken generally along line 4—4 of FIG. 1.

FIGS. 1 and 2 show a cooking utensil 11 which generally includes a receptacle 13, a pumping member 15, and a heater 17. The receptacle 13 in the embodiment illustrated is in the form of a shallow pan of square configuration in plan. The receptacle 13 includes a peripheral wall 19, a flat bottom wall 21, and an open top 23 (FIG. 3). The receptacle 13 is preferably constructed of metal and is adapted to contain batter 25. Of course, the construction illustrated for the receptacle 13 is merely illustrative, and other constructions which are capable of retaining the batter 25 can also be employed.

The pumping member 15 may be of various configurations which can be received within the receptacle 13 and which are capable of displacing some of the batter 25. In the embodiment shown in FIG. 5, the pumping member 15 includes a peripheral wall 27, a transverse wall 29, and an open top 31. The transverse wall 29 in the form shown in FIG. 5 comprises a plurality of parallel slats 33, adjacent pairs of which are separated by elongated slots 35. The peripheral wall 27 extends continuously around the transverse wall 29 and is of the same configuration as the peripheral wall 19 of the receptacle 13. The peripheral wall 27 has a recess 37 in the upper surface adjacent each of the corners. In the embodiment illustrated, the peripheral wall 27 comprises an inner member 39 of metal and an outer member 41 of a resilient sealing material such as silicone rubber.

The peripheral wall 27 is sized and configured so as to be slidably receivable within the peripheral wall 19. Resilient means in the form of four springs 43 located respectively at the corners of the pumping member 15 are provided to support the pumping member. As best seen in FIG. 3, each of the springs 43 may be in the form of a coil compression spring which acts between the peripheral wall 27 and the bottom wall 21 of the receptacle.

The heater 17 may be of conventional construction and include, for example, a metal body 45 and a coiled electrical resistance heating element 47 suitably mounted on the body 45. The heating element 47 has a cooking surface 49, a major portion of which is planar. The cooking surface 49 has an upwardly projecting peripheral portion 51 which slopes inwardly as it extends upwardly. The planar portion of the cooking surface 49 is preferably sized and configured to be loosely receivable within the open top 31 of the pumping member 15.

The heater 17 has a bracket 53 suitably attached to each of its four corners as shown in FIGS. 1 and 3. Each of the brackets 53 includes a first leg 55 attached to the heater 17 and being generally parallel to the bottom wall 21 and a second leg 57 attached to the leg 55 and extending vertically downwardly. Each of the legs 55 includes a projection 59 extending downwardly into a corresponding one of the recesses 37 whereby the heater is mounted on, and supported by, the pumping member 15.

A rigid stem 61 is suitably attached to a central region of the heater 17 and projects upwardly therefrom. A handle 63 is suitably attached to the upper end of the stem 61. A plate 65 is slidably mounted on the stem 63. A plurality of fingers 67, which may be integral with the plate 65, project downwardly from the outer periphery of the plate. A coil spring 69 acts between the underside of the plate 65 and a flange 71 which may be integral with the stem 61 to urge the plate 65 upwardly into engagement with a retainer 73 affixed to the stem 61. The retainer 73 may be covered by a collar 75 of resilient material and each of the tips of the fingers 67 may also be covered by a cover 77 of resilient material.

With this construction, the plate 65 and the fingers 67 can be manually forced downwardly against the biasing action of the spring 69. This causes the resilient fingers 67 to ride along and resiliently bear against the peripheral portion 51 to assist in removing the crepe from the cooking surface 49.

A nozzle 79 is mounted on a bracket 81 which is in turn suitably mounted on the heater 15. One end of the nozzle 79 is affixed to an air bulb 83. The other end of the nozzle 79 is arranged to direct a blast of air against the peripheral portion 51. The air bulb 83 can be manually squeezed to provide a blast of air to the nozzle 79. The peripheral portion 51 of the cooking surface 49 is smoothly convexly curved below the nozzle 79 to assist the air from the nozzle to travel a maximum distance between the crepe and the cooking surface to thereby provide the maximum removal effect.

In use of the utensil 11, the receptacle 13 is filled to the desired level with the batter 25, and the heater 17 is then mounted on the pumping member 15 by placing the ends of the projections 59 (FIG. 3) into the associated recesses 37 in the pumping member. Assuming that the cooking surface 49 is heated to the desired temperature by the heating element 47, the operator pushes downwardly on the handle 63. This moves the heater 17 and the pumping member 15 downwardly as a unit toward the bottom wall 21 against the biasing action of the springs 43. This advances the cooking surface 49 toward the batter 25, and the movement of the pumping member 15 into the batter elevates the batter toward the cooking surface. As the downward movement of the heater 17 continues, the batter 25 is ultimately forced through the slots 35 and against the cooking surface 49. Any lumps in the batter are broken up or filtered out by the slots 35. The spacing between the cooking surface 49 and the slats 33 remains fixed regardless of the depth of insertion of the heater 17 into the batter 25. The pumping member 15 positively prevents the cooking surface 49 from contacting the bottom wall 21.

The cooking surface 49 is immersed in the batter 25 for the desired period of time with the longer immersion times providing a thicker crepe. Thereafter, the springs 43 are allowed to move the pumping member 15 and the heater 17 toward the initial position shown in FIG. 2 in which the cooking surface is out of the batter 25. As the heater 17 and the pumping member 15 move upwardly, the level of the batter 25 drops and this produces waves or turbulence along the upper surface of the batter 25. This in turn tends to exclude air from between the batter and the cooking surface 49 and assure that all regions of the cooking surface 49 are brought into contact with the batter 25. The operator may then remove the heater 17 from the receptacle to allow the cooking of the crepe to continue out of the receptacle 13.

When the crepe is done, it can be removed by squeezing the air bulb 83 and/or by depressing the plate 65. Squeezing of the air bulb 83 directs a jet of air through the nozzle 97 and between the outer edge of the crepe and the adjacent region of the peripheral portion 51. Depressing the plate 65 causes the fingers 67 to push the peripheral region of the crepe away from the adjacent regions of the peripheral portion 51 of the cooking surface 49.

FIG. 5A shows a pumping member 15a which is identical to the pumping member 15 in all respects that the slats 33 have been removed from the pumping member 15a. Accordingly, the pumping member 15a has an open top and an open bottom. Portions of the pumping member 15a corresponding to portions of the pumping member 15 are designated by corresponding reference numerals followed by the letter a.

Although exemplary embodiments of this invention have been shown and described, many changes, modifications and substitutions may be made by one with ordinary skill in the art without necessarily departing from the spirit and scope of this invention.

I claim:

1. A cooking utensil comprising:
    a receptacle for batter, said receptacle having a bottom wall and an open top;
    a pumping member at least partially within said receptacle and mounted for movement toward and away from said bottom wall;
    resilient means for resiliently urging the pumping member away from the bottom wall;
    a heater having a cooking surface, said heater being sized to be received in the receptacle through the open top thereof and moved toward the bottom wall to bring the cooking surface into contact with the batter; and
    means for drivingly coupling the heater to the pumping member at least for a portion of the time that the heater is being moved toward said bottom wall whereby movement of the heater toward said bottom wall drives the pumping member against the biasing action of the resilient means toward the bottom wall to elevate the batter toward the cooking surface.

2. A cooking utensil as defined in claim 1 wherein said coupling means includes means for removably mounting the heater on said pumping member whereby the heater is supported by the pumping member.

3. A cooking utensil as defined in claim 1 wherein said receptacle has a peripheral wall and said pumping member is slidably received within the peripheral wall and mounted thereby for said movement toward and away from the bottom wall.

4. A cooking utensil as defined in claim 3 wherein said pumping member has a transverse wall generally between the cooking surface and the bottom wall, said transverse wall having aperture means therein for the passage of batter through said transverse wall to said cooking surface.

5. A cooking utensil as defined in claim 4 wherein said aperture means includes a plurality of slots.

6. A cooking utensil as defined in claim 3 wherein said pumping member includes a peripheral wall open at its upper end to receive the heater and open at its lower end to expose the cooking surface to the batter, said resilient means being between said bottom wall and said pumping member.

7. A cooking utensil as defined in claim 1 wherein said cooking surface includes an upwardly projecting peripheral portion and said cooking utensil includes a nozzle for directing air toward a region of the peripheral portion and a compressible air bulb for supplying a blast of air to said nozzle.

8. A cooking utenzil as defined in claim 1 wherein the cooking surface includes an upwardly projecting peripheral portion and said cooking utensil includes a stem attached to the heater and projecting upwardly therefrom, a plurality of resilient fingers adjacent said peripheral portion, and means for mounting said fingers on said stem for movement downwardly along said peripheral portion.

9. A cooking utensil comprising:
    a receptacle for batter, said receptacle having a bottom wall and an open top;
    a heater sized to be received in the receptacle through said open top, said heater having a cooking surface;
    means for mounting the heater for guided movement between a first position in which the cooking surface is at a first distance from said bottom wall and a second position in which the cooking surface is in said receptacle at a second distance from said bottom wall, said second distance being less than said first distance whereby the cooking surface can contact the batter in the second position; and
    first means responsive to movement of the heater from said first position toward said second position for forcing the batter in the receptacle upwardly toward the top of the receptacle without adding new batter to the receptacle.

10. A cooking utensil as defined in claim 9 wherein said first means is driven by the heater as the heater is moved from said first position toward said second position.

11. A cooking utensil as defined in claim 9 wherein said cooking surface has a planar portion and an inclined peripheral portion.

* * * * *